US006563970B1

(12) United States Patent
Bohnert et al.

(10) Patent No.: US 6,563,970 B1
(45) Date of Patent: May 13, 2003

(54) PRESSURE SENSOR WITH FIBRE-INTEGRATED BRAGG GRATING, COMPRISING AN INTEGRATED TEMPERATURE SENSOR WITH FIBRE-INTEGRATED BRAGG GRATING

(75) Inventors: Klaus Bohnert, Oberrohrdorf (CH); Hubert Brändle, Oberengstringen (CH); Patrick Bodor, Gippingen (CH)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 09/623,056

(22) PCT Filed: Feb. 12, 1999

(86) PCT No.: PCT/CH99/00065
§ 371 (c)(1),
(2), (4) Date: Aug. 25, 2000

(87) PCT Pub. No.: WO99/44026
PCT Pub. Date: Sep. 2, 1999

(30) Foreign Application Priority Data

Feb. 27, 1998 (DE) .......................................... 198 08 222

(51) Int. Cl.[7] .............................. G01L 9/00; G01L 11/02
(52) U.S. Cl. ............................... 385/13; 385/37; 385/137
(58) Field of Search ............................... 385/13, 37, 137

(56) References Cited

U.S. PATENT DOCUMENTS

| | | | |
|---|---|---|---|
| 4,761,073 A | 8/1988 | Meltz et al. | |
| 5,042,898 A | 8/1991 | Morey et al. | |
| 5,113,070 A | 5/1992 | Smith | |
| 5,414,507 A | 5/1995 | Herman et al. | |
| 5,426,297 A | 6/1995 | Dunphy et al. | |
| 5,469,520 A | 11/1995 | Morey et al. | |
| 5,515,459 A * | 5/1996 | Farhadiroushan | 385/11 |
| 5,612,778 A | 3/1997 | Hall et al. | |
| 5,627,927 A | 5/1997 | Udd | |
| 5,684,297 A | 11/1997 | Tardy | |
| 5,877,426 A | 3/1999 | Hay | |
| 6,278,811 B1 * | 8/2001 | Hay et al. | 385/13 |
| 6,304,686 B1 * | 10/2001 | Yamate et al. | 385/13 |

FOREIGN PATENT DOCUMENTS

| | | |
|---|---|---|
| DE | 39 29 290 A1 | 3/1991 |
| DE | 43 37 402 A1 | 4/1995 |
| DE | 196 48 403 C1 | 4/1998 |
| WO | WO 99/00653 | 1/1999 |

OTHER PUBLICATIONS

Xu, M.G. et al., *Optical In–Fibre Grating High Pressure Sensor*, Electronics Letters, Feb. 18, 1993, vol. 29, No. 4, pp. 398–399.

Hammon, T.E., et al., *A Temperature Compensated Optical Fibre Bragg Grating Band Rejection Filter and Wavelength Reference*, First Optoelectronics and Communications Conference, Chiba, Japan, Jul. 16–19, 1996, Technical Digest, pp. 350–351.

Kersey, A., et al., *Fiber Grating Sensors*, Journal of Lightwave Technology, Aug. 1997, vol. 15, No. 8, pp. 1442–1463.

* cited by examiner

*Primary Examiner*—Hung N. Ngo
(74) *Attorney, Agent, or Firm*—Burns, Doane, Swecker & Mathis, L.L.P.

(57) ABSTRACT

The subject-matter of the present invention is a wavelength-coded fiber Bragg grating pressure sensor 1 which is suitable, in particular, for use in the case of high pressures and temperatures in oil drill holes. The sensor principle according to the invention is based on the fact that the hydrostatic pressure of a liquid or gaseous medium 11 is converted with the aid of a transducer 1 into a longitudinal fiber elongation or fiber compression. The transducer 1 comprises a measuring or pressure cylinder 7a which exchanges pressure with the medium 11, and a reference cylinder 7b which is shielded from the medium 11 or oppositely pressure-loaded. Temperature-compensated transducers 1 with a temperature-independent Bragg wavelength $\lambda_B$ can be realized by introducing a suitable temperature dependence of the mechanical prestressing of the pressure sensor fiber 3 by selecting the materials, lengths and arrangements of the fiber holder supports 5a, 5b. A fiber Bragg grating temperature sensor 19, 20 can be provided, in addition. Also specified are transducers 1 with other cylinder arrangements 7a, 7b, and a wavelength-division multiplex configuration with several transducers 1.

11 Claims, 8 Drawing Sheets

PRESSURE SENSOR WITH FIBRE-INTEGRATED BRAGG GRATING, COMPRISING AN INTEGRATED TEMPERATURE SENSOR WITH FIBRE-INTEGRATED BRAGG GRATING

DESCRIPTION

Fiber Bragg grating pressure sensor with integrated fiber Bragg grating temperature sensor

TECHNICAL FIELD

The invention relates to the field of fiber-optic pressure and temperature measurement.

PRIOR ART

In oil production, drill holes have to be monitored with regard to pressure and temperature. The liquid pressures in the drill hole can be up to 100 NPa (1000 bar), and the temperatures can be up to over 200° C. Electric sensors such as, for example, piezoelectric resistors, piezoelectric elements, capacitive probes, or crystal resonators are frequently used in pressure measurement up to approximately 170° C. It is also known to use optical pressure sensors which are distinguished by good high temperature capacity, corrosion resistance and insensitivity to electromagnetic interference. Examples of this are mechanical resonators, which are activated optically and read out optically, elastooptic sensors, optical sensors with a pressure-sensitive diaphragm, or Fabry- Perot resonators.

A further optical sensor with fiber Bragg gratings for measuring material elongations is disclosed, for example, in U.S. Pat. No. 4,761,073. A refractive index grating, which is written by UV light into a monomode fiber, acts as a reflector or transmission filter with a characteristic Bragg wavelength $\lambda_B$. Longitudinal fiber elongations change the grating period and refractive index and displace the Bragg wavelength $\lambda_B$. The output signals are wavelength-coded and independent of the received light power. Serial multiplexing of several elongation sensors can be realized very easily by writing in along a sensor fiber several Bragg gratings with different reflection wavelengths whose signals can be separated spectrally. It is proposed to eliminate signal interference based on thermal grating elongations with the aid of superimposed gratings of different reflection wavelengths. It is known that instead of being done in a wavelength-selective fashion it is also possible for multiplexing to be performed by time-resolved measurements with the aid of a pulsed light source. In order to monitor body deformations, the sensor fiber is typically fastened on the surface of the body or embedded in the body. If Bragg gratings are used for elongation measurements, the measurement range is limited by the ultimate fiber strength.

Fiber Bragg grating sensors for measuring isotropic pressures of liquids are presented in the article by M.G. Xu et al., "Optical In-Fibre Grating High Pressure Sensor", Electronics Letters 29 (4), 398–399 (1993). The sensor fiber is introduced with the Bragg grating into a high-pressure vessel and immediately exposed to the hydrostatic pressure of a fluid. However, the isotropic pressure sensitivity is exceptionally low for Bragg gratings in glass fibers; the specific Bragg wavelength displacement is typically only 0.0003 nm/ 100 kPa at 1550 nm. Moreover, it is necessary to compensate temperature effects because of the high temperature sensitivity of typically 0.01 nm/°C.

An apparatus for longitudinal compression of optical fibers is described in U.S. Pat. No. 5,469,520. The sensor fiber is threaded with the fiber Bragg grating into several cylindrical ferrules and two end tubelets, and the ferrules and tubelets are mounted in a groove between two metal blocks which can be screwed to one another. The ferrules can be displaced laterally in the groove, one tubelet is connected to the metal blocks and the other is fastened on a moveable slide. By displacing the slide, the fiber is compressed on the free links between the tubelets, in particular between the ferrules, and lateral escape is simultaneously prevented by the groove. It is possible to realize a very wide pressure measurement range because of the fact that the pressure strength of glass fibers ("fused silica fibers") is approximately 20 times greater than their elongation strength.

U.S. Pat. No. 5,042,898 discloses a device for temperature stabilization of fiber Bragg gratings. The fiber Bragg grating is clamped over a gap between two supports with different coefficients of thermal expansion. The supports are screwed to one another at a common supporting point via a spacer thread with the aid of which the gap width and/or fiber prestressing and/or Bragg wavelength can be set. The differential fiber elongation between the fiber holders is dimensioned precisely such that the thermally induced changes in the Bragg wavelength can be compensated. This is achieved by selecting the support materials and the spacings between the supporting point and the fiber holders. In an embodiment which can be subjected to pressure, a glass capillary is provided in the gap for the purpose of accommodating the fiber Bragg grating. The carrier materials and the length and inside and outside diameters of the glass capillary are to be coordinated with one another for the purpose of temperature compensation. A temperature-stabilized fiber Bragg grating of this type can be used as a wavelength standard, for stabilizing the emission wavelength of laser diodes, or as a wavelength filter in fiber-optic sensors.

SUMMARY OF THE INVENTION

It is the object of the present invention to specify a fiber Bragg grating pressure sensor which is suitable for wavelength-coded measurement of isotropic pressures in liquids or gases and is distinguished by a compact transducer which can be designed for high pressures. This object is achieved according to the invention by means of the features of claim 1.

Specifically, the core of the invention is to specify a fiber-optic transducer in which a pressure sensor fiber with a fiber Bragg grating is fastened on supports by means of fiber holders, and at least one support is fitted with a pressure member for converting an all round pressure of a medium into a longitudinal elongation of the pressure sensor fiber.

A first exemplary embodiment shows a pressure-transmitting element (=transducer) with a pressure-loaded inner cylinder and an unloaded outer cylinder, which are arranged in a housing whose differential pressure elongation is transmitted to a sensor fiber, and whose differential temperature elongation stabilized the Bragg wavelength of the sensor fiber.

A second exemplary embodiment relates to variants of the transducer in the case of which the outer cylinder is simultaneously the housing and is subjected to pressure, and in the case of which the sensor fiber can also be placed under compressive load.

A third exemplary embodiment constitutes a transducer with an annular cylinder which is pressure loaded from inside, and force-transmitting center cylinders for elongation of the sensor fiber at both ends.

A fourth exemplary embodiment constitutes a transducer with a supporting cylinder which is pressure loaded from outside, and center cylinders, which are oppositely pressure-loaded for the purpose of relieving pressure from the sensor fiber at both ends.

Further exemplary embodiments relate to fiber holders and ferrules for fixing and prestressing the pressure sensor fiber in the transducer.

Another exemplary embodiment constitutes a serial, reflexive multiplexing arrangement of several fiber Bragg grating pressure sensors with different Bragg wavelengths, which are fed via a common broadband light source and are detected in a wavelength-selective fashion.

Additional exemplary embodiments follow by combining features which are essential to the invention, and from the dependent claims.

An important advantage of the fiber Bragg grating pressure sensor according to the invention consists in that it is possible with the aid of the wavelength-coded pressure signal to realize a high measuring accuracy, a wide pressure measurement range of up to 100 MBa and a large measuring distance between the passive sensor head and active optical system and electronic system.

A further advantage of the fiber Bragg grating pressure sensor consists in that it is possible for the temperature sensitivity to be largely suppressed by a differential design of the transducer, and thereby for the reliability of (quasi) static pressure measurements to be substantially improved.

Finally, also very advantageous features of the fiber Bragg grating pressure sensor are the ease with which it can be combined with a fiber Bragg grating temperature sensor, the simple ability to multiplex several combined pressure and temperature sensors and, overall, the excellent suitability for use under high pressures, at high temperatures and with strong corrosion, in particular in oil drill holes.

BRIEF DESCRIPTION OF THE DRAWING

The invention is explained below with the aid of exemplary embodiments. For a fiber-optic temperature-compensated pressure sensor with an integrated temperature sensor.

Identical parts are provided with identical reference symbols in the figures.

WAYS OF IMPLEMENTING THE INVENTION

Figure 1A:
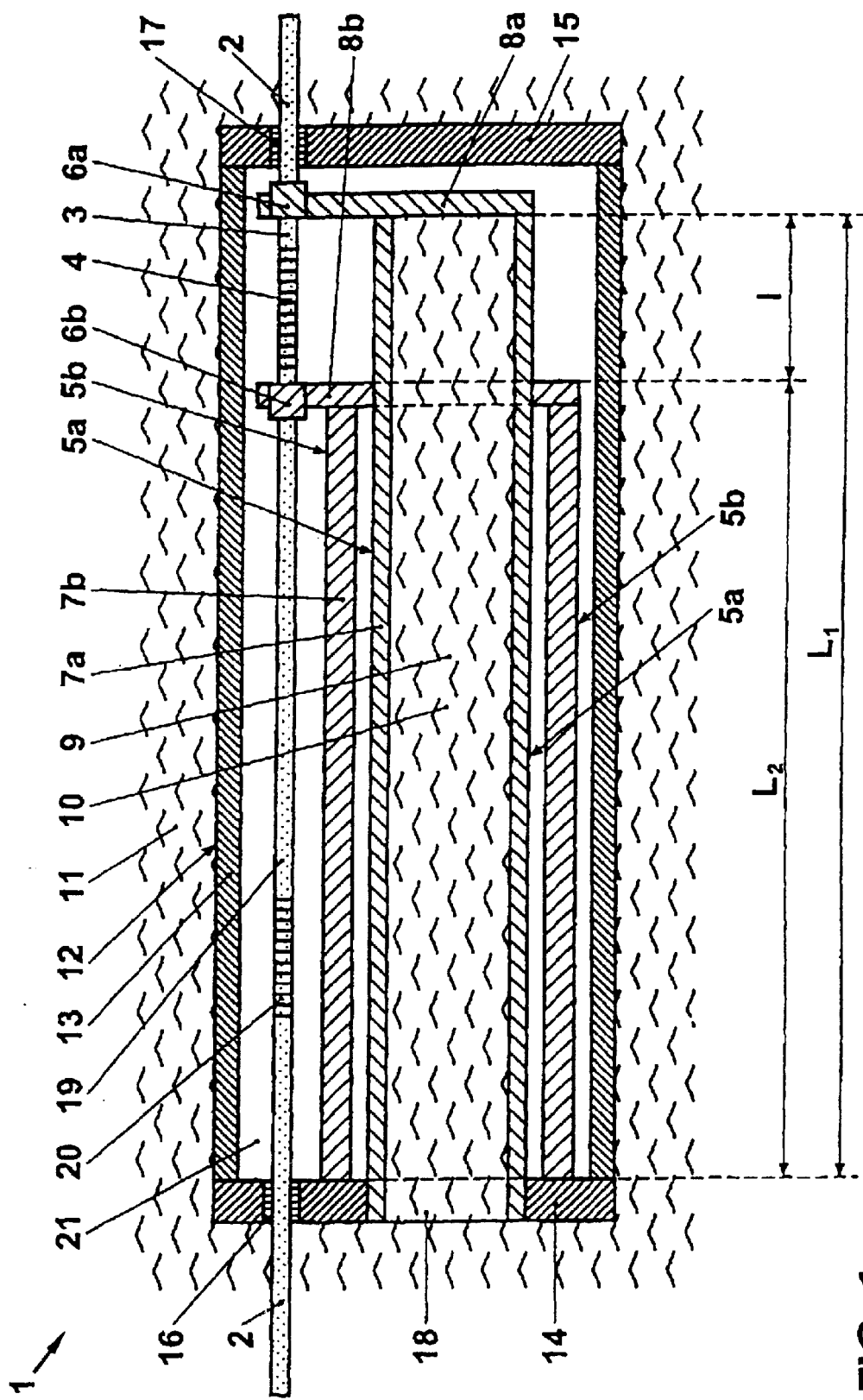
FIGS. 1a, 1b show a mechanical pressure transmitting element (=transducer) with an inner cylinder which is pressure loaded, and an unloaded outer cylinder for differential elongation of the sensor fiber.
Figure 1B:
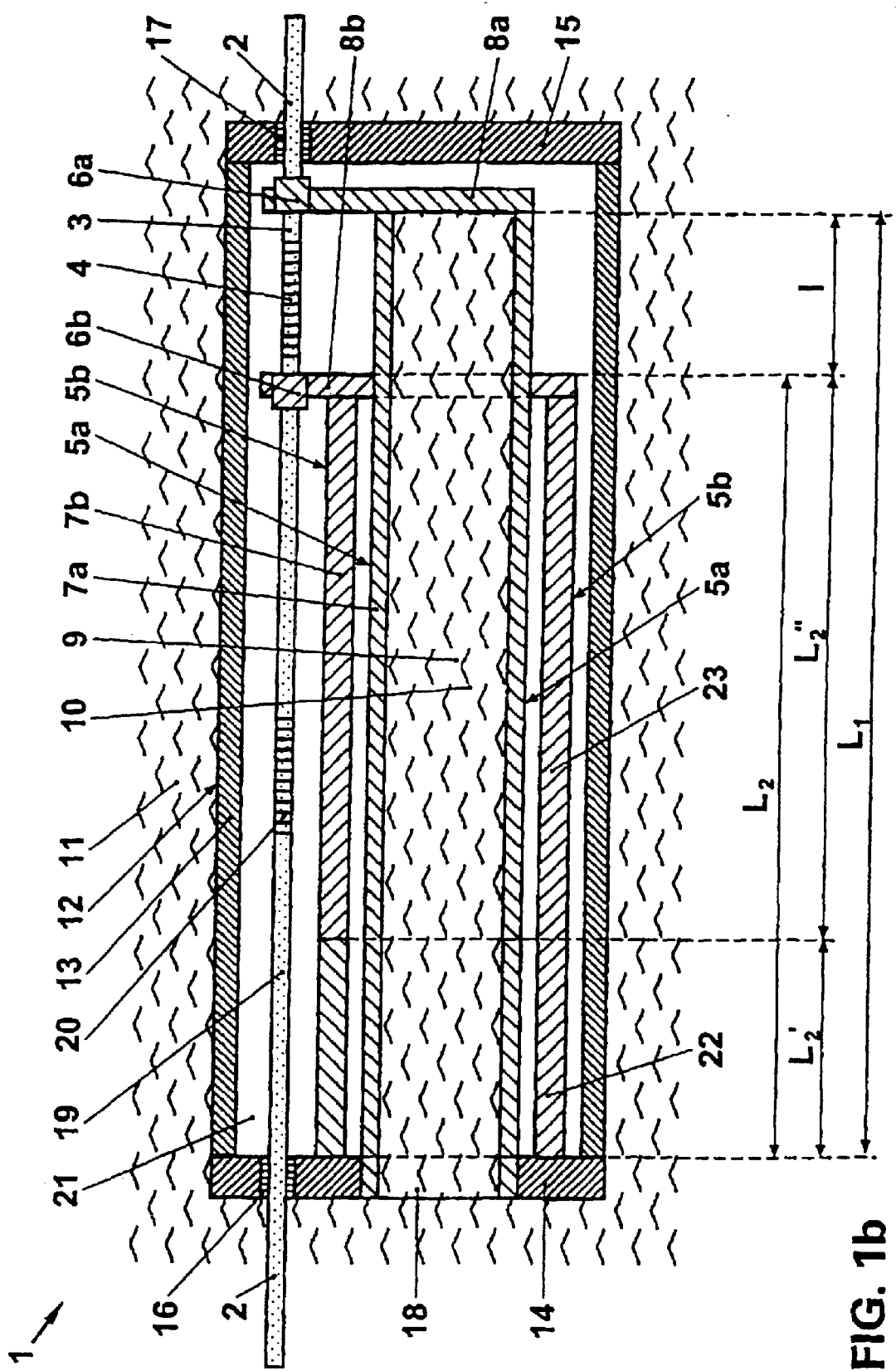

FIGS. 1a, 1b show a first embodiment of the sensor 1 or pressure-transmitting element V transducer) 1 schematically in cross section. The transducer 1 includes an optical fiber 2, which has two sections with a pressure sensor fiber 3 and an optional temperature sensor fiber 19 respectively having one written-in fiber Bragg grating 4, 20 each. The pressure sensor fiber 3 is held between two fiber or ferrule holders 6a, 6b and prestressed. The holders 6a, 6b are permanently connected via end plates 8a, 8b to supports 5a, 5b such that their pressure and temperature-induced elongations can be transmitted to the pressure sensor fiber 3.

A first support 5a comprises as measuring or pressure cylinder 7a an inner cylinder 7a which can be extended by internal pressure and which has an opening 18 in a transducer wall 14 and a cavity 9 with a plunger face 8a. The opening 18 serves to pick up the pressure of a medium 11, the cavity 9 serves to transmit pressure by means of a fluid 10, and the plunger face 8a serves to output pressure to a fiber holder 6a. The fluid 10 is normally the medium 11 itself. In the case of all the transducer design [sic] (FIGS. 1a–3b), the opening 18 can be selected to be small and, possibly, fitted with a pressure compensating element 29, for example a diaphragm or a bellows, and a silicone oil or the like can be provided as the fluid 10, which is preferably not very compressible. The inner cylinder 7a is connected in a pressure-tight fashion to the wall 14 in the region of the opening 18. The pressure-insulated housing interior 21 is advantageously filled with a low-pressure gas, for example dry nitrogen, at a few 100 mbar. As a result, adequate heat transfer is ensured between the medium 11 or transducer 1 and the temperature-sensitive fiber Bragg grating 20, and at the same time the influence of temperature-induced gas pressure changes in the housing interior is kept small. In less demanding applications, tilling at normal pressure, or a vacuum can suffice. A second support 5b comprises a reference cylinder or outer cylinder 7b which is shielded from the ambient medium 11 and can therefore not be loaded, and which is not in contact with the fluid 10. The cylinders 7a, 7b are fastened on the transducer wall 14 and encapsulated in a transducer housing 12. The housing 12 preferably comprises a housing cylinder 13 with walls 14, 15 into which pressure-tight fiber bushings 16, 17 are inserted. Clamps or the like (not illustrated) can be provided to terminate fiber cables outside at the walls 14, 15.

The pressure and temperature sensitivity of a sensor 1 in accordance with figures 1a, 1b can be adapted and, in particular, optimized by dimensioning the transducer 1 in a fashion according to the invention. The pressure-induced elongation $\Delta L_1$ of the inner cylinder 7a of length $L_1$ is $$\Delta L_1 = \epsilon_t L_1 \quad (G1a)$$

$\epsilon_t$, that is to say the longitudinal extension of the inner cylinder 7a, being calculated from $$\epsilon_t = (1/E) \cdot [\sigma_x - \mu(\sigma_\omega + \sigma_r)] \quad (G1b)$$

$$\epsilon_t = (1/E) \cdot [pR_i^2/(R_1^2 - R_i^2)] \cdot [1 - 2\mu] \quad (G1c)$$

with inside radius $R_i$, outside radius $R_a$, Young's modulus of elasticity E, Poisson's ratio $\mu$ and pressure p of the medium 11 to be measured.

In this case, $\sigma_x$ is the longitudinal, $\sigma_r(r)$ the radial and $\sigma_\omega(r)$ the tangential stress of the inner cylinder 7a:

$$\sigma_x = pR_i^2/(R_a^2-R_i^2) \tag{G1d}$$

$$\sigma_r(r) = [pR_i^2 - pR_i^2 \, R_a^2/r^2]/[(R_a^2-R_i^2) \tag{G1e}$$

$$\sigma_\omega(r) = ]pR_i^2 + pR_i^2 R_a^2/r^2]/(R_a^2-R_i^2) \tag{G1f}$$

The length $L_2$ of the outer cylinder 7b remains unchanged, with the result that the pressure sensor fiber 3 of length 1 experiences an elongation of $$\Delta l = \Delta L_1 \tag{G2}$$

Glass fibers ("fused silica fibers") exhibit a linearly elastic, hysteresis-free behavior for relative elongations $\Delta l/l$ up to approximately 0.01. The displacement of the Bragg wavelength is also proportional to the elongation in this range. On the other hand, the linear elasticity range for steel as a typical material for an inner cylinder 7a is limited to relative extensions of $\Delta L_1/L_1 \leq 0.001$.

For a wide pressure-measurement range of high resolution, the permissible elongation of the fiber should be utilized to the greatest possible extent. On the other hand, a not too high elongation favors a long service life of the fiber. A maximum fiber elongation of $\Delta l/l = 0.005$ is a sensible compromise between high resolution and long service life. The relationship then holds, with $p_{max}$=maximum pressure, the extension limit $\Delta L_1/L_1 \leq 0.001$ of the inner cylinder 7a or transducer 1 requiring to be observed. A quantitative example for this: $p_{max}$=100 MPa, $\epsilon$=1.96·10$^{11}$ Pa, $\mu$=0.28, $R_a$=4 mm, $R_i$=2.8 mm. The length ratio of inner cylinder 7a to pressure sensor fiber 3, or the extension transmission ratio $L_1/l$=23 then requires to be selected, for example l=15 mm and $L_1$=34.5 cm. For the given parameters, the deformation corresponding to the longitudinal stress $\sigma_x$ of the inner cylinder 7a is 0.5·10$^{-3}$. The deformation corresponding to the tangential stress is $$\Delta L_t/L_t = \sigma_\omega(R_a)/E = 2\cdot(p/E)\cdot R_i^2/(R_a^2-R_i^2) \tag{G4a}$$
$$= 1.0\cdot 10^{-3}$$

on the outside ($r=R_a$) of the inner cylinder, and $$\Delta L_t/L_t = \sigma_\omega(R_i)/E = 2\cdot(p/E)\cdot R_i^2/(R_a^2-R_i^2) \tag{G4b}$$
$$= 1.5\cdot 10^{-3}$$

on the inside ($r=R_i$)
The deformation corresponding to the radial stress is $$\Delta L_r/L_r = \sigma_r(R_a)/E = 0 \tag{G4c}$$

on the outside of the inner cylinder, and $$\Delta L_r/L_r = \sigma_r(R_i)/E = -(p/E) = 0.5\cdot 10^{-3} \tag{G4d}$$

on the inside of the inner cylinder.
The deformations therefore remain in the elastic range.
The invention also relates to a compensation of thermally induced Bragg wavelength displacements of the pressure sensor fiber 3 by means of an opposite differential thermal expansion of the cylinders 7a, 7b.

In the simplest case in accordance with FIG. 1a, the cylinders 7a, 7b are selected from two materials with different coefficients of thermal expansion $\alpha_1$ and $\alpha_2$. The dimensioning of the cylinder lengths $L_1$ and $L_2$ is performed as in the U.S. Pat. No. 5,042,898 mentioned at the beginning. The relative Bragg wavelength displacements owing to temperature $(\Delta\lambda_B)_T/\lambda_B$ and the temperature-induced fiber elongation $(\Delta\lambda_B)_\epsilon/\lambda_B$ are intended to compensate one another, that is to say to be of the same size and opposite sign, specifically $$(\Delta\lambda_B)_T/\lambda_B = -(\Delta\lambda_B)_\epsilon/\lambda_B. \tag{G5}$$

With the aid of the equations $$(\Delta\lambda_B)_T/\lambda_B = 6.67\cdot 10^{-6}\,°C^{-1}, \tag{G6}$$

$$(\Delta\lambda_B)_\epsilon/\lambda_B = 0.78\cdot\Delta\epsilon_T \text{ and} \tag{G7}$$

$$\Delta\epsilon_T = [(\alpha_1\cdot L_1 - \alpha_2\cdot L_2 - \alpha_f\cdot l)/l]\cdot\Delta T, \tag{G8}$$

where $\alpha_f$=0.5·10$^{-6}$ °C$^{-1}$=thermal elongation of the pressure sensor fiber 3, this yields the dimensioning rule for the cylinders 7a, 7b, specifically $$(\alpha_2\cdot L_2 - \alpha_1\cdot L_1)/l = 8.0\cdot 10^{-6}\,°C^{-1}, \tag{G9}$$

where $l = L_1 - L_2$. Assuming that $l$=15 mm, $L_1$=30 cm and therefore $L_2$=28.5 cm, for $\alpha_1$=12.4·10$^{-6}$°C$^{-1}$ the required thermal coefficient of expansion of the outer cylinder 7b is yielded as $\alpha_2$=13.5·10$^{-6}$°C$^{-1}$. In particular, the fiber elongation $\Delta\epsilon_T$ must decrease with increasing temperature and at constant pressure. The prestressing is therefore to be selected to be so large that the pressure sensor fiber 3 is still under mechanical stress even at the highest operating temperatures and vanishing pressure.

This transducer 1 is distinguished by a high mechanical stability, low temperature sensitivity and the ease with which it can be produced. The cylinders 7a, 7b preferably consist of stainless steel. In addition to linear coefficients of thermal expansion, in accordance with equation (G9) suitable transducer materials are also to have a slight nonlinearity in thermal expansion, and a high corrosion resistance. These requirements are particularly important in the case of sensors for oil drill holes, since a wide temperature range (0°C–230°C) must be covered and there is an extremely high risk of corrosion. Consequently, the selection is limited to steels of a few, extremely corrosion-resistant types, and in many instances passive temperature compensation cannot be carried out, or can be carried out only incompletely.

FIG. 1b specifies a variant of the transducer 1 which permits complete temperature compensation even given a limited selection of materials. The idea according to the invention consists in assembling one or both cylinders 7a, 7b from two or more segments of selectable length and with different coefficients of thermal expansion, and in this way to tailor the differential expansion of the cylinders 7a, 7b. In particular, as before, the inner cylinder 7a is designed in one piece, and the outer cylinder 7b in two pieces. For example, the segment 22 may consist of the same type of steel as the inner cylinder 7a. It may have a length $L_2'$ and a coefficient of expansion $\alpha_1$. Segment 23 may consist of another type of steel, have a length of $L_2''$ and a coefficient of expansion $\alpha_2$. The new relationships $$(\alpha_2\cdot L_2'' - \alpha_1\cdot\alpha_1\cdot(L_2''+l))/l = 8.0\cdot 10^{-6}\,°C^{-1}, \tag{G10}$$

$$L_2 = L_2' + L_2'' \tag{G11}$$

hold in this case.

Thus, for given coefficients of expansion $\alpha_1$, $\alpha_2$ and pressure sensor fiber length 1, the segment lengths $L_2"$, $L_2'$ of the outer cylinder 7b are to be selected in accordance with equations (G10) (G11) for complete temperature compensation it being the case that the inner cylinder length $L_1=1 +L_2$. It is preferably possible to combine a nickel-based alloy (for example "Hastealloy C-22" from Hynes International with $\alpha_1 = 12.4 \cdot 10^{-6} °C^{-1}$) with a chromium-nickel steel (for example "AISI 304" with $\alpha 2 = 17.0 \cdot 10^{-6} °C^{-1}$). $L_2' = 6.65$ cm and $L_2" = 21.85$ cm are then to be selected in the above example with $1=15$ mm and $L_1=30$ cm.

It is preferable in FIGS. 1a and 1b, and generally in the case of all disclosed transducers 1, to provide a temperature sensor fiber 19 with a fiber Bragg grating 20 which is not prestressed. Apart from being used to monitor the ambient temperature, the temperature information which is obtained from the temperature-induced Bragg wavelength displacement can also serve the purpose of electronic compensation of a residual temperature dependence of the pressure measurement.

Figure 2A:
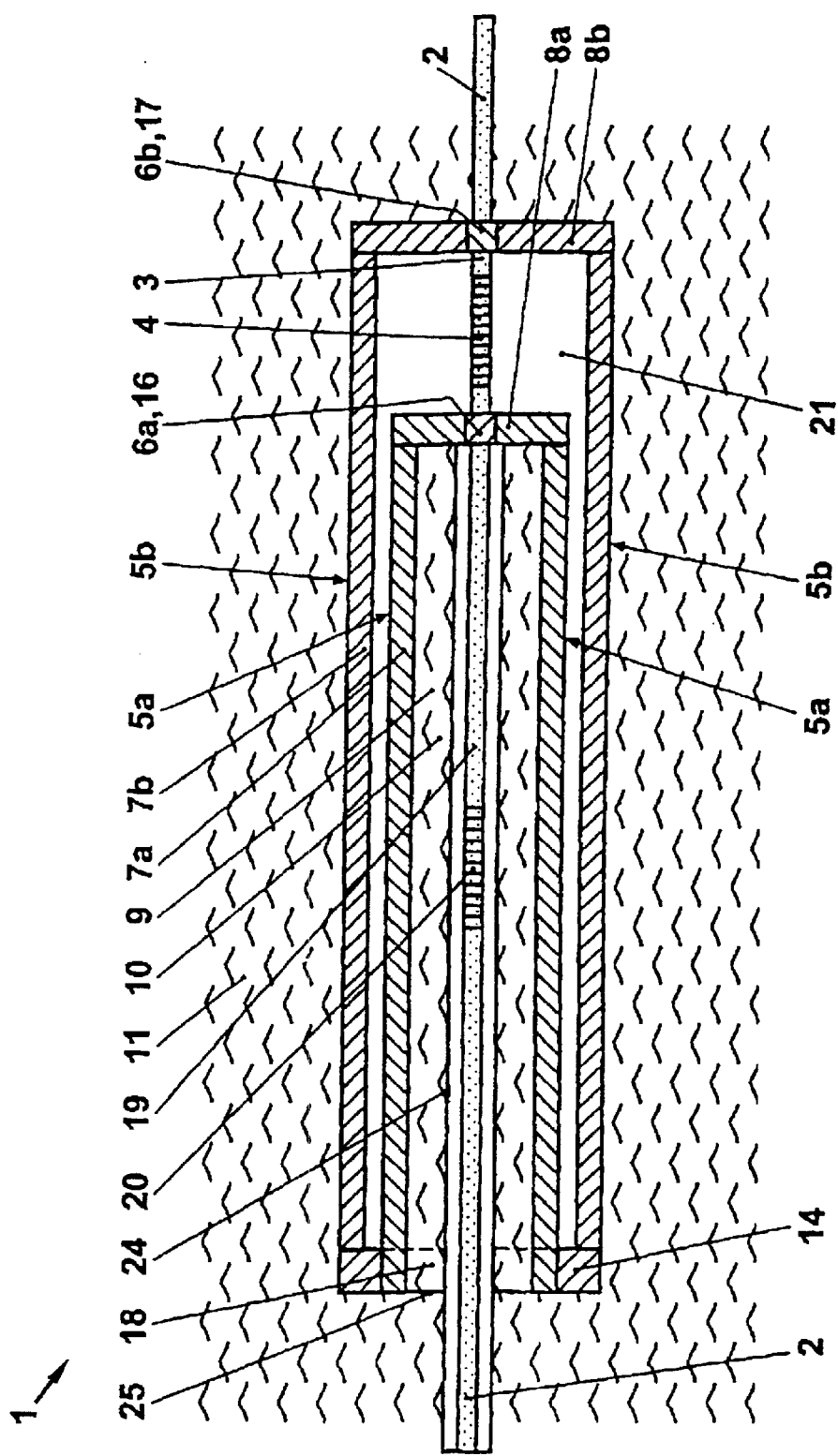
FIGS. 2a, 2b show a transducer with inner and outer cylinders which are oppositely pressure-loaded, for pressure relief (2a) or for compression (2b) of the sensor fiber.

FIG. 2a shows an embodiment of the transducer 1 without encapsulation 12. The transducer 1 is designed in an exactly similar way as before, but the outer cylinder 7b also functions as housing 12. Both the inner cylinder 7a and the outer cylinder 7b have plunger faces 8a and 8b which can be loaded from outside with opposite pressure. The volume 21 between the cylinders 7a, 7b is sealed in a pressure-tight fashion and preferably filled, as before, with low-pressure gas. The fiber 2 extends along the axis of the concentric cylinders 7a, 7b and forms in turn a pressure sensor fiber 3 and, in particular, a temperature sensor fiber 19 with the associated fiber Bragg gratings 4, 20. The fiber holders 6a, 6b for the pressure sensor fiber 3 are fastened in the center of the plunger faces 8a, 8b and can simultaneously be designed as pressure-tight fiber bushings 16, 17. The fiber prestressing is selected to be large enough to cover the desired pressure and temperature range. The temperature sensor fiber 19 is preferably protected against the medium 11 by a capillary 24 which is held by struts 25, and can be fitted at the outer end with fiber cable clamps (not illustrated).

This transducer 1 is distinguished in that the opposite compressive extension of the plunger faces 8a, 8b effects pressure relief of the sensor fiber 3 at both ends, and thus a doubled pressure sensitivity in conjunction with unchanged cylinder dimensions, in particular with constant ratios of inside to outside radii. Alternatively, the same Bragg wavelength displacement at pressure can be achieved in the case of half the length $L_2$ of the transducer 1. Moreover, the diameter of the transducer 1 without housing 12 can be selected to be very small, and this is of great significance for use in drill holes. In addition, it is possible in the case of transducers 1 according to FIG. 2a or 2b to achieve temperature compensation by a tailored differential extension of the cylinders 7a, 7b in accordance with FIG. 1a or 1b.

Figure 2B:
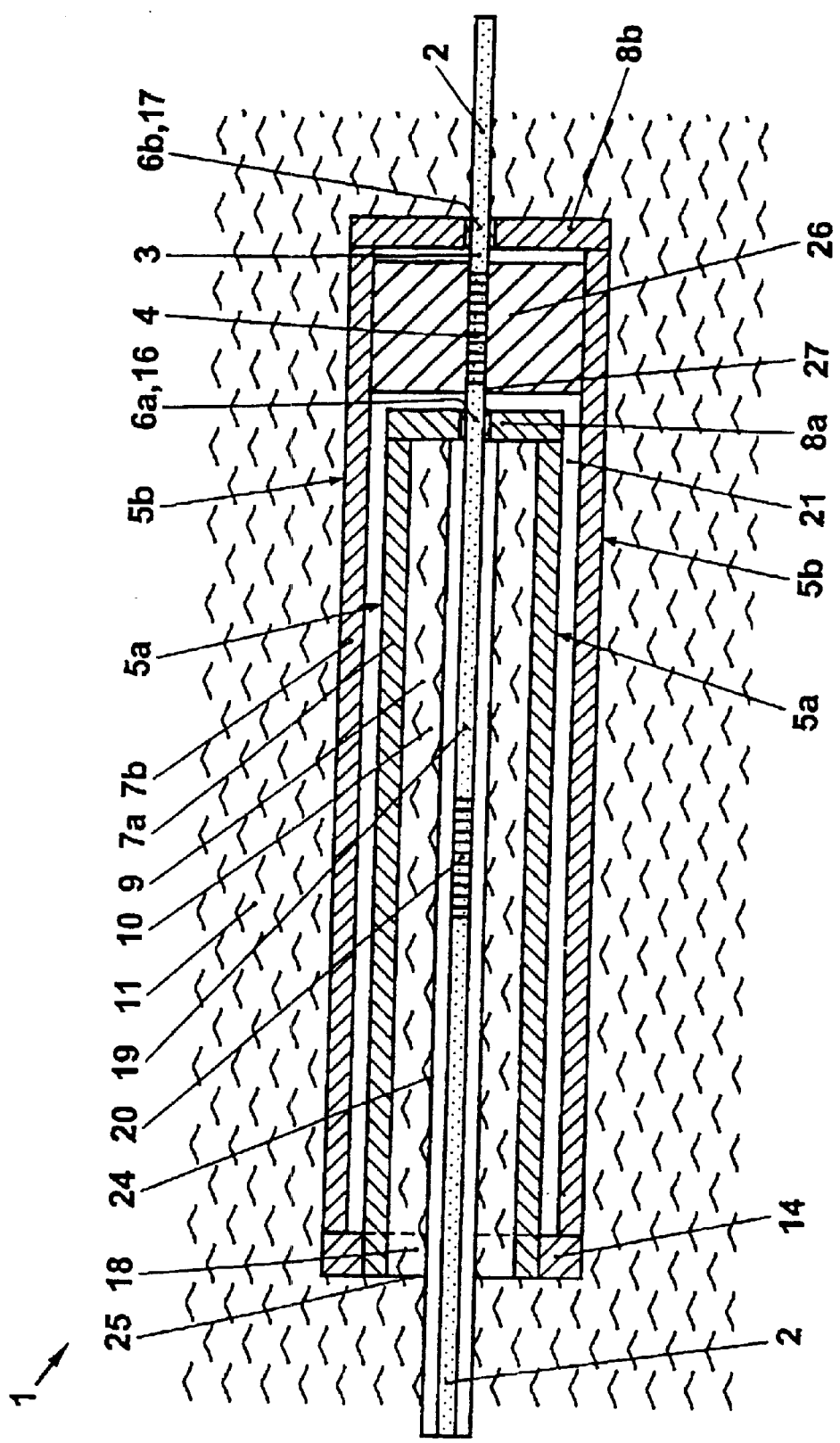

FIG. 2b shows a variant of FIG. 2a, in the case of which the pressure sensor fiber 3 can be loaded by compression. Arranged for this purpose in the housing interior 21 is a preferably cylindrical block 26 with a bore 27, which block serves the purpose of accommodating the pressure sensor fiber 3 with the fiber Bragg grating 4. The bore hole diameter is selected to be somewhat larger than the fiber diameter such that the fiber can be displaced longitudinally, but cannot escape laterally under compression. Because of the high compressive strength of the fibers 3, it is possible to realize a wide measurement range and a high resolution power. It is possible in principle for any design of the transducer 1 according to the invention for which the sensor fiber 3 is relieved of pressure (FIGS. 2a, 2b, 3b) or can be precompressed (FIGS. 1a, 1b, 3a) to be fitted with such a compression arrangement 26, 27.

Figure 3A:
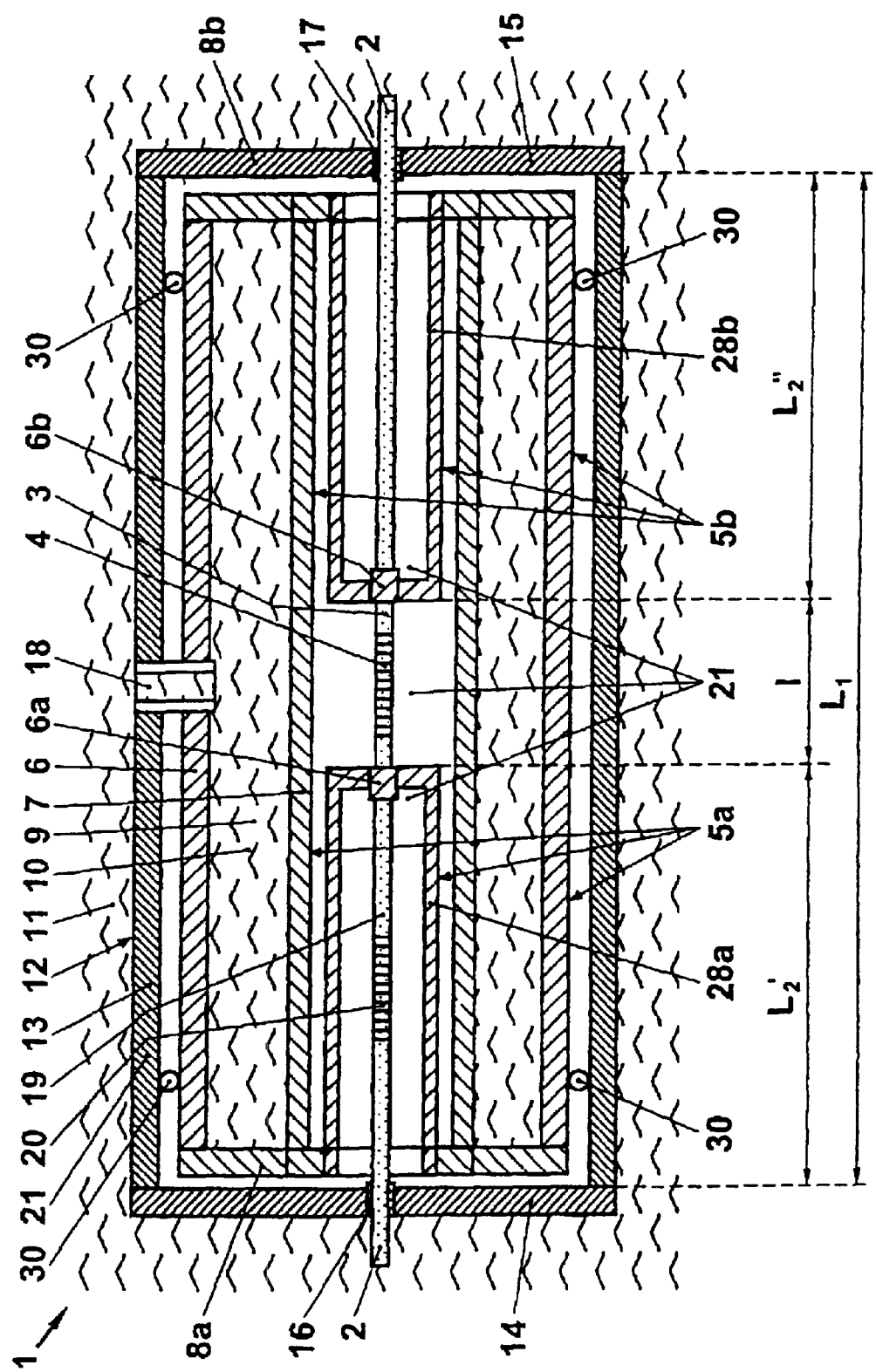
FIG. 3a shows a transducer with a hollow cylinder which is pressure loaded from inside, and force transmitting center cylinders for elongating the sensor fiber at both ends.

FIG. 3a illustrates a further exemplary embodiment of a transducer 1. The two supports 5a, 5b for fastening the fiber holders 6a, 6b are combined here to form a common hollow or annular cylinder 7c and provide mutual support for one another. The supports 5a, 5b therefore surround as pressure cylinder 7c the annular cylinder 7c, which can be extended by internal pressure and separate holders 28a, 28b, in particular symmetrically arranged center cylinders 28a, 28b via which the fiber holders 6a, 6b can be operationally connected to the annular cylinder 7c. In particular, the annular cylinder 7c comprises a cavity 9 with an opening 18 laterally in the cylinder outer wall and end plunger faces 8a, 8b in the form of annular cylinder covers 8a, 8b. The annular cylinder 7c is connected in a pressure-tight fashion to the housing cylinder 13 in the region of the opening 18 and mounted in the transducer housing 12 via positioning elements 30. The housing interior 21 outside the annular cylinder 7c is preferably filled with a low-pressure gas. Alternatively a gas or air, for example at normal pressure, or a vacuum can be provided. The optical fiber 2 extends along the axis of the annular cylinder 7c and is clamped between the fiber holders 6a, 6b in the region of the pressure sensor fiber 3. A non-prestressed temperature sensor fiber 19 with a fiber Bragg grating 20 is advantageously accommodated in a center cylinder 28a. As previously, pressure-tight fiber bushings 16, 17 are provided in the housing walls 14, 15.

This embodiment is distinguished in that both supports 5a, 5b have a common pressure member 7c. The change in length of the annular cylinder 7c caused by internal pressure is converted by the rigid center cylinders 28a, 28b into a change in length of the pressure sensor fiber 3 which is of the sane (absolute) magnitude. The inner and outer walls of the annular cylinder 7c experience extensions of the same magnitude when the cylinder covers 8a, 8b are sufficiently stiff. Moreover, it is possible to realize symmetrical loading of the annular cylinder 7c by suitable selection of the wall thicknesses.

In order to compensate temperature-induced Bragg wavelength displacements, the lengths and coefficients of expansion of the annular cylinder 7c ($L_1$, $\alpha_1$) and of the center cylinders 28a ($L_2'$, $\alpha_1$) and 28b ($L_2"$, $\alpha_2$) are available as parameters. Of course, the center cylinders 28a, 28b can also respectively be assembled from segments with different coefficients of expansion $\alpha_1$ and $\alpha_2$, $L_2'$ and $L_2"$ respectively denoting the overall lengths of the center cylinder segments with $\alpha_1$ and $\alpha_2$ respectively. The thermal expansion of the center cylinders 28a, 28b effects the desired relief of the fiber 3 with increasing temperature, and counteracts the thermal extension of the annular cylinder 7c. Consequently, the equations G10 and G11 according to the invention are valid in turn for the temperature compensation, and equation G9 holds for the special case that both center cylinders 28a, 28b have the same coefficient of expansion $\alpha_2$. In this embodiment, the pressure sensitivity is halved by comparison with FIGS. 1a, 1b, since the oil pressure must lengthen the double-walled annular cylinder 7c. The prestressing can be selected to be the same as in the case of FIGS. 1a, 1b. It is advantageous that the sensor fiber 3, 19 is guided along the transducer axis and requires no capillary 24 or similar protection against the oil 11.

Figure 3B:
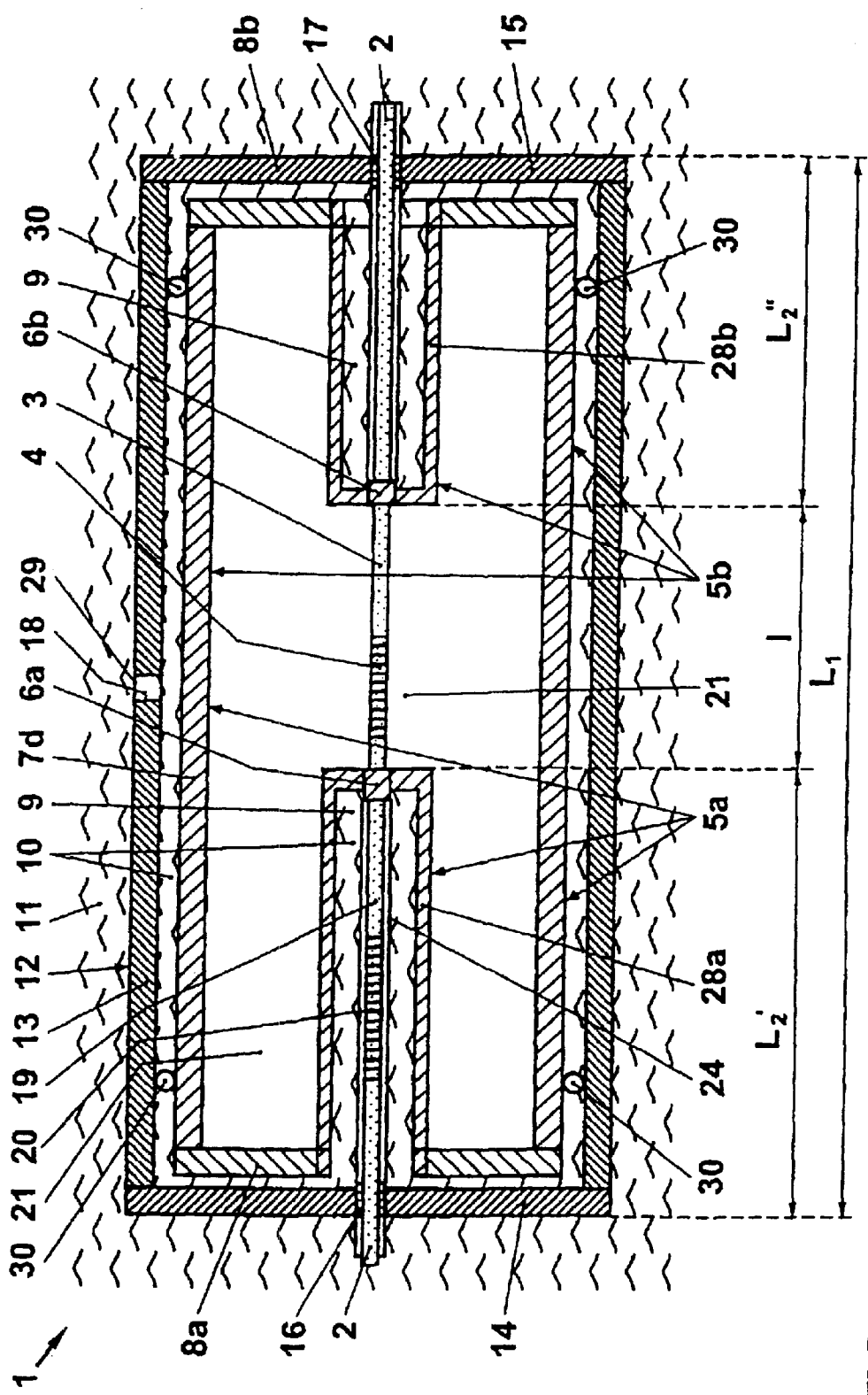
FIG. 3b shows a transducer with a hollow cylinder which is pressure loaded from outside, and center cylinders, which are oppositely pressure loaded, for pressure relief of the sensor fiber at both ends.

FIG. 3b shows a variant of the transducer 1 from FIG. 3a. Instead of the annular cylinder 7c, the supports comprise a supporting tube 7d, in particular a hollow or supporting cylinder 7d, which can be compressed by external pressure, and center cylinders 28a, 28b which can be extended by external pressure. In particular, the supporting cylinder 7d has end plunger faces 8a, 8b which are offset inwards in the region of the axis and thereby form the center cylinders 28a, 28b. The fiber holders 6a, 6b are preferably fastened on the plunger faces 8a, 8b of the center cylinders 28a, 28b. The pressure exchange between the pressure cylinders 7d, 28a, 28b and the medium 11 is performed, as previously, via an opening 18, which is protected, if appropriate, by a diaphragm 29 or the like. The supporting cylinder 76, which is closed in a pressure-tight fashion, is now tilled in the interior 21, preferably with low-pressure gas, and remounted in the housing 12 via positioning elements 30. The arrangement of the fibers 2, 3, 19 is unchanged. A capillary 24 can be provided to protect the fibers 2, 19 in the fluid 10 or medium 11. Under pressure, the supporting cylinder 7d is compressed, the center cylinders 28a, 28b are extended and the pressure sensor fiber 3 is relieved by the sum of the two deformations. As in FIG. 2a, the fiber prestressing is to be adapted to the desired pressure and temperature ranges, and it is possible to realize a compression arrangement 26, 27 (not illustrated) . The housing 12 together with the positioning elements 30 can be omitted in a way similar to FIG. 1b. The same considerations as in the case of the transducer 1 according to FIG. 3a hold for the temperature compensation.

An advantage of this transducer 1 is the pressure sensitivity, which is approximately fourfold by comparison with FIG. 3a. This pressure sensitivity is the result, on the one hand, of the identical direction of the extension of the cylinders 7d, 28a, 28b and, on the other hand, of the approximately doubled elasticity of the supporting cylinder 7d by comparison with an annular cylinder 7c of the same dimensions.

In summary, FIGS. 1–3 show exemplary embodiments of a fiber-optic sensor 1 which is suitable, in particular, for pressure and temperature measurement in oil drill holes. The sensor 1 comprises a transducer 1 with fiber holders 6a, 6b for a pressure sensor fiber 3 which has at least one fiber Bragg grating 4, the fiber holders 6a, 6b being mounted on at least one support 5a, 5b. According to the invention, at least one support 5a, 5b comprises a pressure member 7a–7d, 28a, 28b which is suitable for converting an all round pressure of an ambient medium 11 into a longitudinal elongation or compression of the pressure sensor fiber 3. A liquid, a gas a mixture of liquid and gas or fine sand, inter alia, come into consideration as the medium 11. In particular, the pressure member is a pressure cylinder 7a–7d, 28a, 28b, and has a cavity 9 with an opening 18 and a plunger face 8a, 8b which is operationally connected to a fiber holder 6a, 6b. The transducer 1 preferably comprises a pressure-insulated chamber 21, 24 with pressure-tight fiber bushings 16, 17 for the pressure sensor fiber 3, and just two supports (5a, 5b) are provided which consist of, or are assembled from materials with different coefficients of thermal expansion $\alpha_1$, $\alpha_2$, a differential thermal expansion between these supports 5a, 5b counteracting a thermally induced displacement of the Bragg wavelength $\lambda_B$ of the pressure sensor fiber 3. The differential thermal expansion between the two supports 5a, 5b, in particular the cylinders 7a, 7b or the center cylinders 28a, 28b, can advantageously be continuously selected by virtue of the fact that at least one of the supports 5a, 5b is assembled from at least two segments 22, 23 with different coefficients of thermal expansion $\alpha_1$, $\alpha_2$ and prescribable lengths $L_2'$, $L_2''$. A common sensor fiber 3, 19 can also have both the pressure sensor fiber 3 and the temperature sensor fiber 19 with a fiber Bragg grating 20. Finally, also possible are transducers 1 with many different forms and arrangements of pressure members, isotropic pressure being converted by means of said pressure members into longitudinal elongation or compression of the pressure sensor fiber 3.

In the case of use in oil drill holes, all the transducers 1 exhibit the common problem of inward diffusion of gases, in particular of hydrogen and hydrocarbons, into the housing interior 21 or into the capillary 24. High hydrogen partial pressures of up to 20 bar can occur. Hydrogen in the fibers 3, 19 causes optical losses and changes in refractive index, and thus interfering displacements of the Bragg wavelength $\lambda_B$. A method according to the invention for protecting the sensor fibers 3, 19 consists in coating the transducer surfaces not in contact with the oil 11, in particular the housing interior 21 and/or the capillary 24, preferably with gold.

Figure 4:
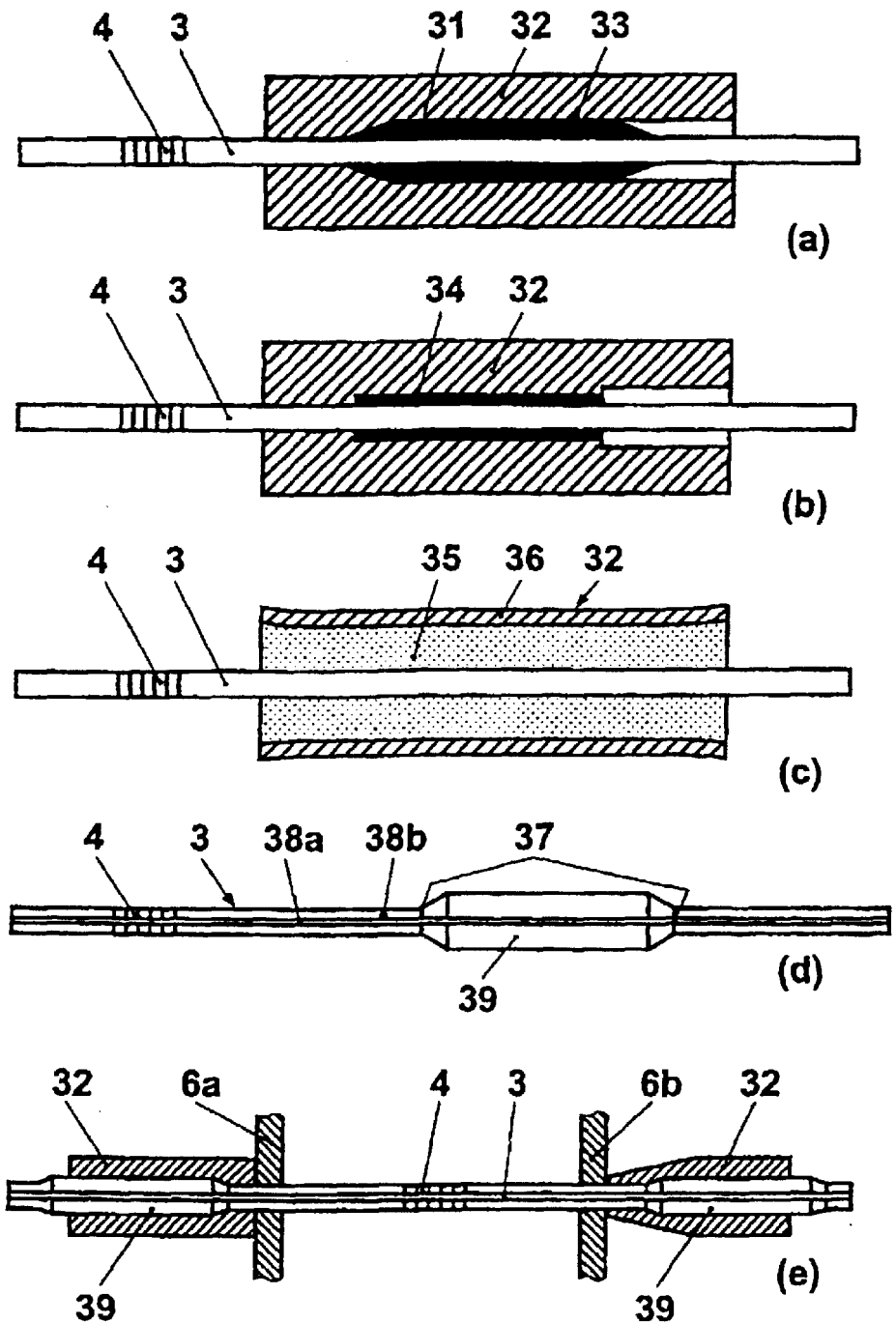
FIGS. 4a–4e show fiber holders and ferrules: (4a) a spliced-on glass capillary, (4b) a glass solder connection, (4c) a clamping ferrule, (4d) a spliced-in fiber with thick cladding; and (4e) a fastening of the ferrules on the transducer.

FIG. 4 shows exemplary embodiments relating to ferrules 32. The anchoring of the pressure sensor fiber 3 in the ferrules 32 is very critical, since the accuracy and long-term stability of the sensor 1 is impaired by creeping of the fiber 3. In FIG. 4a, the fiber 3 is fused with a concentric glass capillary which can be fastened, for example, in a ferrule 32 by means of a bond 33. It appropriate, several glass capillaries are interspliced. In FIG. 4b the fiber 3 is connected to the ferrule 32 by glass solder 34. The ferrule 32 can also be open at least one end in order to ensure that glass solder 34 is applied in a controlled and uniform fashion, Specified in FIG. 4c is a clamping ferrule 32 in the case of which a solid cylinder made from a soft metal 35 is fixed on the fiber 3 by pressing on a hollow cylinder made from hard metal 36. The pressing on is advantageously strongest in the middle of the ferrule, in order to achieve a longitudinal stress on the fiber 3 which decreases outwards. In FIG. 4d, a length of fiber with a diameter similar to that of the fiber core 38a and the thicker cladding 38b is inserted into the sensor fiber 3 via splices 37 and can be fixed very easily in the ferrule 32. Another solution (not illustrated) consists in bonding the pressure sensor fiber 3 into a V groove with the aid of an adhesive which is stable at high temperatures, for example one based on polyimide. Finally, FIG. 4e shows how the preferably cylindrical or conical ferrules 32 can be fastened in or on ferrule holders 6a, 6b. A particularly space-saving solution consists in providing the fiber holders 6a, 6b themselves with a bore for accommodating the fiber 3, or fashioning them as ferrules 32.

Figure 5:
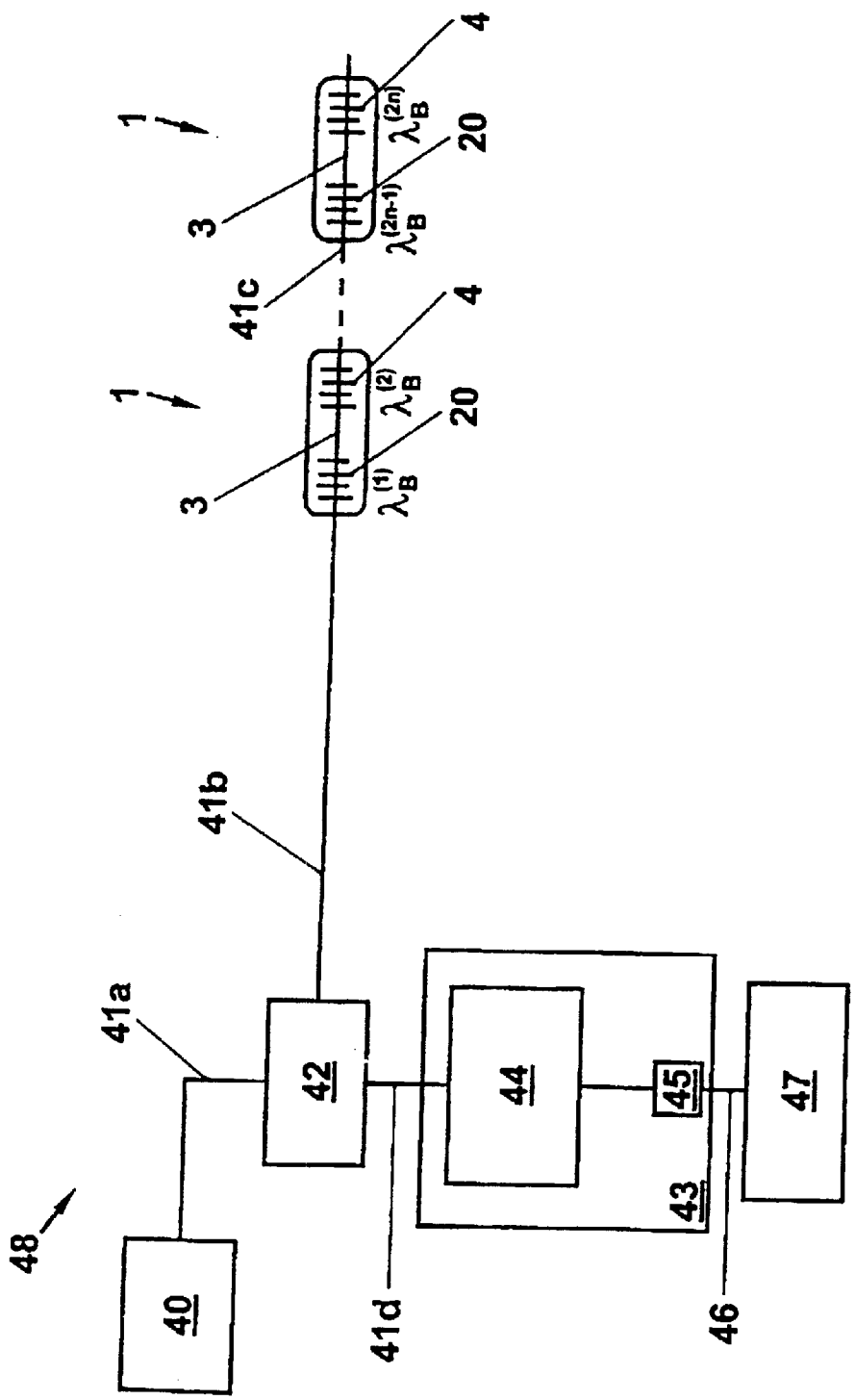
FIG. 5 shows a reflecting arrangement of several wavelength-division multiplex pressure and temperature sensors.

FIG. 5 shows an overall design of a quasi-distributed pressure and temperature sensor 48. A wavelength-division multiplex arrangement with several transducers 1 connected serially one behind another and operated using reflection is shown by way of example. The transducers 1 have different Bragg wavelengths $\lambda_B^{(i)}$ of their fiber Bragg gratings for pressure measurement 4 and temperature measurement 20. The transducers 1 are optically connected to a broadband light source 40 and a detection unit 43, preferably via a fiber coupler 42. In particular, feeder fibers 41a–41d are provided for bridging the optical links between the active sensor optoelectronic system 40, 43, 47 and the transducers 1. The detection unit 43 has a wavelength-division demultiplexer 44 and a detector 45 which is typically connected to an electronic evaluation system 47 via an electric signaling line 46. The wavelength-division demultiplexer 44 can be a tunable spectral filter, for example a tunable Fabry-Perot interference filter, or a tunable acoustooptic modulator. The spectral width of the filter is to be comparable to that of the fiber Bragg gratings 4, 20, and preferably smaller. The transducers 1 are detected individually by the photodiode 45 by virtue of the fact that the filter is continuously tuned to the associated Bragg wavelength $\lambda_B^{(i)}$. The fibers 2, 3, 19, 41a–41d can be of any desired type. The sensor fibers 3, 19 with the fiber Bragg gratings 4, 20 are preferably monomode ones.

Fiber lasers doped with rare-earth elements, light-emitting diodes (LED) and superluminescent diodes (SLD) are particularly suitable as broadband light source 40 for the serial wavelength-division multiplexer arrangement 48 illustrated. The spectral emission range comprises the Bragg wavelengths $\lambda_B^{(i)}, \ldots \lambda_B^{(2n)}$ of the n transducers 1 in the overall pressure and temperature tuning range. The individual tuning ranges are not to overlap. A central wavelength of 1550 nm is advantageous for minimum losses in the case of large fiber links 41a–41d in the range of several km. The typical spectral width is then ±25 nm. A maximum elongation of the temperature-compensated pressure sensor fiber Bragg grating 4 of 0.005 and a temperature range of 230° C. may be assumed. The associated tuning ranges are then 6 nm for the pressure measurement and 2.3 nm for the temperature measurement. With safety margins, a transducer 1 therefore requires a wavelength window of approximately 10 nm, and the maximum number of pressure and temperature transducers 1 which can be subjected to wavelength-division multiplexing is limited to five. As an alternative or a supplement to wavelength-division multiplexing, other multiplexing methods are possible for increasing this number, for example time-division multiplexing, or it is possible to use fiber-optic switches. It is also possible to realize in a simple way parallel or network-type configurations of transducers 1 which are to be read out by reflection and/or transmission.

Overall, the invention discloses a fiber Bragg grating sensor 1, 48 with different transducers 1 for converting the hydrostatic pressure of a liquid or gaseous medium 11 into a longitudinal fiber elongation or fiber compression. Temperature-compensated transducers 1 with stable Bragg wavelength $\lambda_B$ can be realized by introducing a suitable temperature dependence of the mechanical prestressing of the pressure sensor fiber 3 by selecting the materials, lengths and arrangements of the fiber holder supports 5a, 5b. As a supplement or alternative to the passive temperature compensation, an active temperature measurement is possible with the aid of an additional fiber Bragg grating 20 and pressure signal correction. The transducers 1 are very suitable for use under high pressures and at high temperatures.

LIST OF REFERENCE SYMBOLS

| | |
|---|---|
| 1 | Fiber-optic pressure and temperature sensor (transducer) |
| 2 | Optical fiber |
| 3, 19 | Sensor fiber(s) |
| 3 | Sensor fiber segment, pressure sensor fiber |
| 4 | Fiber Bragg grating (for pressure measurement) |
| 5a, 5b | Supports |
| 6a, 6b | Fiber holders, ferrule holders |
| 7a–7d | Pressure members, pressure cylinders |
| 7a | Inner cylinder |
| 7b | Reference cylinder; outer cylinder |
| 7c | Annular cylinder |
| 7d | Supporting cylinder |
| 8a, 8b | Plunger faces, end plates, cylinder covers |
| 9 | Cavity |
| 10 | Fluid, silicone oil; medium |
| 11 | Medium |
| 12 | Transducer housing |
| 13 | Housing cylinder |
| 14, 15 | Transducer wall, housing wall |
| 16, 17 | Pressure-tight fiber bushings |
| 18 | Opening |
| 19 | Sensor fiber segment, temperature sensor fiber |
| 20 | Fiber Bragg grating (for temperature measurement) |
| 21 | Housing interior, cylinder interior, low-pressure gas |
| 22, 23 | Outer cylinder segments |

-continued

LIST OF REFERENCE SYMBOLS

| | |
|---|---|
| 24 | Capillary |
| 25 | Struts |
| 26 | Block |
| 27 | Bore |
| 28a, 28b | Holders, center cylinders |
| 29 | Pressure compensating element, diaphragm, bellows |
| 30 | Positioning elements |
| 31 | Glass capillary (fused) |
| 32 | Ferrule |
| 33 | Bond |
| 34 | Glass solder |
| 35 | Soft metal |
| 36 | Hard metal |
| 37 | Splices |
| 38a | Fiber core |
| 38b | Fiber cladding |
| 39 | Fiber adapter |
| 40 | Broadband light source |
| 41a–41d | Feeder fibers |
| 42 | Fiber coupler |
| 43 | Detection unit |
| 44 | Wavelength demultiplexer, (tunable) spectral filter |
| 45 | Detector, photodiode |
| 46 | Signaling line |
| 47 | Electronic evaluation system |
| 48 | Overall sensor |
| l | Length of the pressure sensor fiber |
| $\Delta l$ | Elongation of the pressure sensor fiber |
| $L_1$ | Length of the pressure cylinder |
| $L_2$ | Length of the reference cylinder |
| $L_2', L_2''$ | Sublengths of the reference cylinder |
| $\Delta L_1$ | Extension of the pressure cylinder |
| $R_i$ | Inside radius of the pressure cylinder |
| $R_a$ | Outside radius of the pressure cylinder |
| E | Young's modulus of elasticity of the pressure cylinder |
| p | Measuring pressure |
| $p_{max}$ | Maximum measuring pressure |
| T | Temperature |
| $\alpha_1, \alpha_2, \alpha_f$ | Coefficient of thermal expansion |
| $\Delta \epsilon_T$ | Thermally induced fiber elongation |
| $\lambda_B, \lambda_B^{(i)}$ | Bragg wavelength |
| $(\Delta \lambda_B)_T, (\Delta \lambda_B)_\epsilon$ | Bragg wavelength displacements |
| i,, n | Indices |

What is claimed is:

1. A fiber-optic sensor particularly suitable for pressure and temperature measurement in oil drill holes comprising:
   a transducer with fiber holders for a pressure sensor fiber:
      the fiber holders being mounted on at least one support, the at least one support comprises a pressure membrane for converting an all around pressure of a medium into a longitudinal elongation or compression of the pressure sensor fiber;
   wherein the pressure sensor fiber has at least one fiber Bragg grating, said fiber being prestressed or precompressed in the region of the at least one fiber Bragg grating.

2. The fiber optic sensor in accordance with claim 1, wherein
   a) the transducer includes a pressure-insulated chamber with pressure-tight fiber lead-ins for the pressure sensor fiber, and having
   b) exactly two supports which are composed of materials with different coefficients of thermal expansion ($\alpha_1$, $\alpha_2$), and wherein
   c) a differential thermal expansion between the supports counteracts a thermally-induced shift in the Bragg wavelength ($\lambda_B$) of the pressure sensor fiber and
   d) at least one of the supports has at least two segments with different coefficients of thermal expansion and predefinable lengths.

3. The fiber-optic sensor in accordance with claim 1, wherein
   a) a sensor fiber comprises both the pressure sensor fiber and also a temperature sensor fiber and
   b) the temperature sensor fiber has a fiber-integrated Bragg grating.

4. The fiber optic sensor in accordance with claim 1, wherein
   a) the pressure chamber is a pressure membrane,
   b) the pressure membrane having a cavity with an opening and at least one piston surface and
   c) the piston surface being interactively connected with a fiber holder.

5. The fiber optic sensor in accordance with claim 4, wherein
   a) a first support in the form of a pressure cylinder includes an inner cylinder which can be expanded by internal pressure,
   b) a second support includes an outer cylinder shielded from a surrounding medium, and wherein
   c) the cylinders are fixed to a transducer wall and encapsulated in a transducer casing.

6. The fiber optic sensor in accordance with claim 4, wherein
   a) a first support in the form of a pressure cylinder includes an inner cylinder which can be expanded by internal pressure,
   b) a second support includes an outer cylinder which can be compressed by external pressure, and
   c) the cylinders are fixed to a transducer wall.

7. The fiber optic sensor in accordance with claim 4, wherein
   a) the supports in the form of a pressure cylinder include a ring cylinder which can be expanded by internal pressure,
   b) the ring cylinder being mounted in a transducer casing by means of positioning elements and
   c) the fiber holders are interactively connected with the ring cylinder by axial cylinders.

8. The fiber-optic sensor in accordance with claim 4, wherein
   a) the supports include a supporting cylinder which can be expanded by external pressure and
   b) the fiber holders are fixed to the piston surfaces of the axial cylinders.

9. The fiber optic sensor in accordance with claim 1, wherein
   a) several transducers of different Bragg wavelength ($\lambda_B^{(i)}$) are optically connected with a wide-band light source and a detection unit by means of a fiber coupler and
   b) the detection unit includes a wavelength demultiplexer and a detector which is connected to evaluation electronics.

10. The fiber optic sensor in accordance with claim 1, wherein
    a) a block with a bore is provided to receive the pressure sensor fiber,
    b) the pressure chamber membrane is filled with a fluid, and
    c) the pressure-isolated chamber is filled with a low-pressure gas or a vacuum.

11. The fiber optic sensor in accordance with claim 10, wherein the fluid is silicone oil.

* * * * *